United States Patent [19]

Sonderegger et al.

[11] 4,255,163
[45] Mar. 10, 1981

[54] BALANCING DEVICE

[75] Inventors: Hans C. Sonderegger, Neftenbach; Urs B. Meyer, Niederglatt, both of Switzerland

[73] Assignee: Kistler Instrumente AG, Switzerland

[21] Appl. No.: 946,870

[22] Filed: Sep. 29, 1978

[30] Foreign Application Priority Data

Sep. 29, 1977 [CH] Switzerland ............ 11878/77

[51] Int. Cl.³ ................ B24B 41/04; B24B 45/00
[52] U.S. Cl. .................................. 51/169; 74/573 F
[58] Field of Search ................. 51/169; 74/573 F

[56] References Cited

U.S. PATENT DOCUMENTS

| | | | |
|---|---|---|---|
| 1,159,052 | 11/1915 | Leblanc | 51/169 |
| 1,986,648 | 1/1935 | Simonds | 51/169 |
| 2,534,268 | 12/1950 | Kahn et al. | 74/573 F |
| 3,273,293 | 9/1966 | Sonderegger et al. | 51/169 |
| 3,950,897 | 4/1976 | Birkenstack et al. | 51/169 |
| 3,967,416 | 7/1976 | Birkenstack et al. | 51/169 |
| 4,050,195 | 9/1977 | Hofmann | 51/169 |

FOREIGN PATENT DOCUMENTS

| | | | |
|---|---|---|---|
| 401533 | 5/1966 | Switzerland | 51/169 |
| 418001 | 2/1967 | Switzerland | 51/169 |

OTHER PUBLICATIONS

P. G. Petrukha, Rig for Balancing Grinding Wheels, Machines and Tooling, 1972, vol. XLlll No. 1, pp. 42-43.

Primary Examiner—Harold D. Whitehead
Assistant Examiner—Bradford Adolphson
Attorney, Agent, or Firm—Craig and Antonelli

[57] ABSTRACT

A device for balancing rotating bodies including a sensing arrangement for sensing the out of balance of the rotating body and for generating a control signal of approximately rectangular pulse shape. An electromagnetic transducer response to the control pulse signal is provided and is operated at a frequency in accordance with the speed of the rotating body. A spray valve is combined with the electromagnetic transducer to form a single spray unit and at least one spray disk is mounted on the rotating body to be balanced, the spray disk having at least three chambers or compartments. A spray medium is supplied to the spray unit which injects the spray medium into at least one chamber in response to the control pulse signal with correct phasing during the normal revolution of the rotating body until the amount of spray medium injected compensates for the out of balance of the rotating body.

18 Claims, 14 Drawing Figures

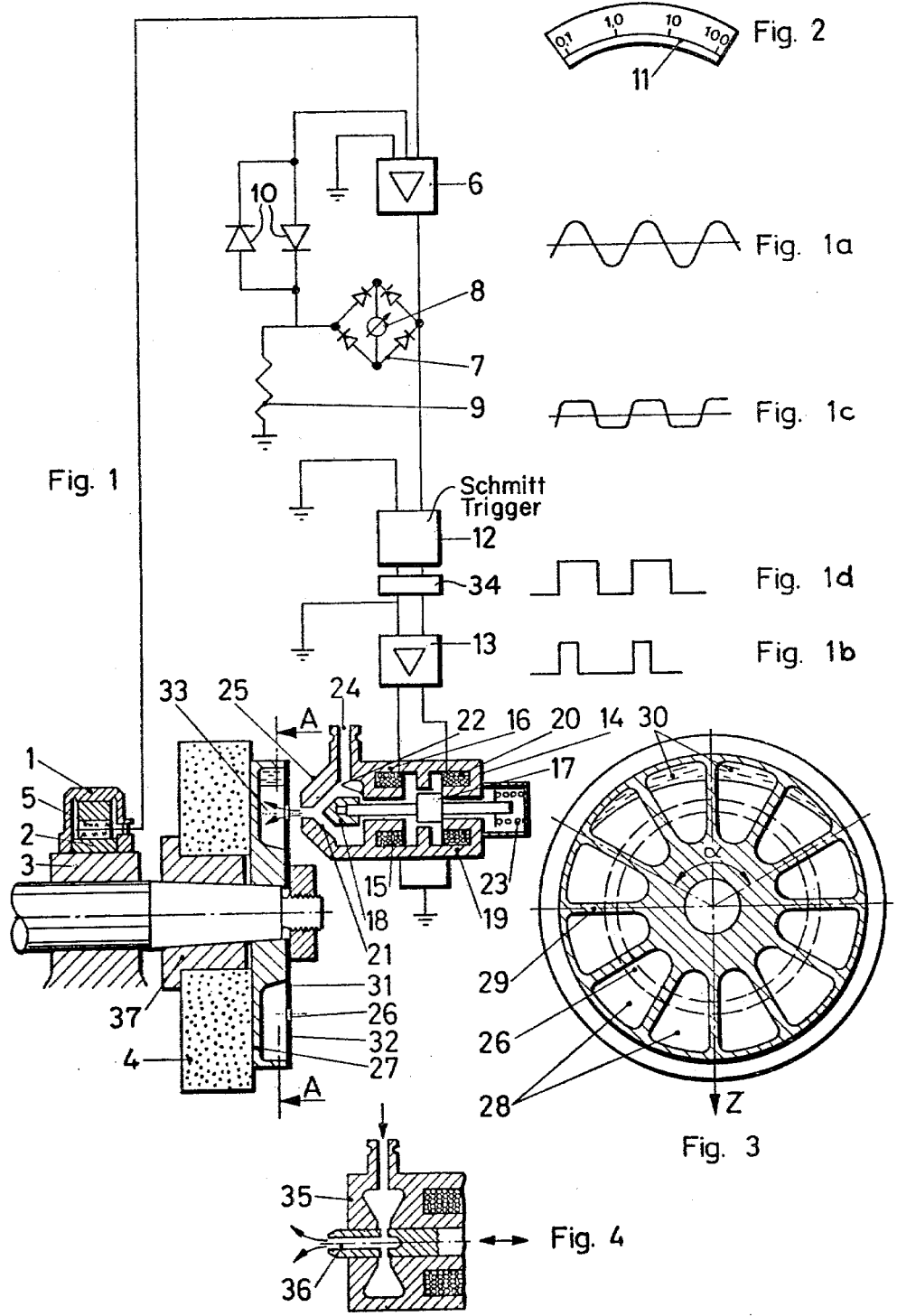

BALANCING DEVICE

BACKGROUND OF THE INVENTION

1. Field of the Invention

The present invention refers to a device for balancing rotating bodies. With regard to the state of the art it relates to the Swiss Pat. Nos. CH 401,533 and CH 418,001.

2. Description of the Prior Art

For many machine tools with a rotating tool, and particularly with grinding machines, exact balancing of the rotating system is of great importance. On grinding machines an unbalanced grinding wheel will rotate in a noncircular manner, and this will be evident on the outer ground surface of the workpiece. For the finest and most uniform grinding therefore, exact balancing of the grinding wheel is essential.

Grinding wheels may, however, become out of balance in use, so that renewed balancing is necessary. To eliminate the lack of balance, grinding machines are already known in this connection which embody built-in means for determining the magnitude and phase position of the out-of-balance; with the machine stationary the lack of balance can be compensated in known manner by means of adjustable counterweights. This correcting procedure must often be repeated several times, which results in objectionable interruptions of operation.

In addition, grinding machines are known which permit balancing during operation of the machine, though this entails comparative complication. For this purpose weights are adjusted within the flange of the grinding wheel until the lack of balance is eliminated; also known are complicated devices for automatic balancing, in which such weights are automatically adjusted according to the lack of balance.

Grinding wheel balancing devices have also become known which employ a balancing head consisting of a series of solenoid valves, which act on a four-segment chamber system. By an optimization process the individual valves are supplied with grinding fluid until a reduction of the out-of-balance is detected. This method is electronically and mechanically complicated, however, and is trouble-prone.

SUMMARY OF THE INVENTION

The invention makes possible continuous monitoring of the out-of-balance state of a rotating body, with corrective action initiated either manually or automatically in order to restore the optimal balance state in the rotating body.

One practical application of the invention is on grinding machines, where the out-of-balance state of the grinding wheel is subject to perpetual changes due to wear and absorption of coolant. The invention enables these changes to be measured, indicated, and reduced automatically or semi-automatically to the nominal state.

The application of the invention is not confined to grinding machines however. It is equally suited for balancing machines for example. Previously on such machines the rotor to be balanced was mounted on a specially supported shaft and made to rotate. The position and magnitude of the out-of-balance were then determined using known means. By dismounting the rotor and drilling-away, the out-of-balance mass is reduced in stages until finally no more out-of-balance is indicated. This procedure involves several operations and a great deal of specialized knowledge as well, making the entire procedure very expensive. Owing to the fact that the invention makes it possible to measure continuously during operation and apply material to the appropriate point in the same mounting, very speedy, inexpensive and effective balancing can be obtained. Moreover the deposition of material effected in this way is much more satisfactory from the strength aspect than the usual drilling-away.

The invention may also be embodied as a portable unit, however, for balancing various rotary machines like motors, blowers, tubines, etc.

The device according to the invention is characterized by a transducer which interacts with the bearing of the rotating body and generates an electrical signal of sinusoidal form, which corresponds to the component of the out-of-balance force occurring in the plane of the axis of rotation of the body and the transducer, and an electromechanical transducer controlled by this signal, whose mechanical part includes a spray valve, which in the presence of an out-of-balance signal performs valve oscillations at a frequency corresponding to the speed of the rotating body or a fraction of this, causing material to be sprayed on at the appropriate phase angle until the out-of-balance signal disappears.

In order to minimize the moving masses, the electromechanical transducer is advantageously combined with the spray valve to form a single assembly. On the rotor to be balanced, a spray disk is provided; this catches the sprayed material and holds it so that it cannot spread circumferentially under the action of centrifugal force. By suitable control of the spray valve, material is sprayed onto a sector on the side opposite the out-of-balance vector until the lack of balance is compensated. Plastic masses or any sprayable fluid may be used as spraying media.

When using the invention on grinding machines, water or the grinding fluid employed on the machine is used conveniently for spraying. The spray disk is then made preferably in the form of a compartmented wheel with at least three separate compartments, into which the spraying medium can be delivered. The compartmented wheel is fitted straight onto the flange of the grinding wheel, or it may be an integral part of the flange. The compartmented wheel may also consist of a disposable plastic unit.

In the especially preferred embodiments of the invention, the mechanoelectrical transducer serving to generate the signal may be either a force transducer, accelerometer or linear motion transducer; it may also be provided advantageously with a piezoelectric element, whose output is used to control the valve tool. The electromechanical transducer controlled by this signal may conventiently be in the form of an oscillating magnet or a solenoid valve direct.

Means may conveniently be provided for amplifying the signal generated by the mechanoelectrical transducer before it is led to the electromechanical transducer. Furthermore means may be provided advantageously for indicating the amplitude of the signal generated. This indication means then shows the amount of out-of-balance at any time, and allows the effectiveness of a balancing operation to be verified.

A further particular advantage of the device according to the invention is that the electromagnetic transducer serving to operate the valve is controlled by rectangular pulses, and that when the valve core is displaced the armature of the transducer comes to rest against a stop.

In one preferred embodiment of the invention the electromagnetic transducer has one coil and one stop each for the outward and return strokes of the valve armature. Here the copper cross section of the solenoid coils is not more than half the size of the smallest iron cross section for the magnetic flux surrounding the solenoid coils. In addition the two solenoid coils are arranged on tubular magnetic cores which have a flange at one end. With their flanged part the cores rest on a tubular distance piece, and all three parts are inserted in a fitting outside housing and clamped in this. At the middle on the inside, the distance piece has a web, which serves the transition of the force lines onto the transducer armature. The arrangement is such that the magnetic resistance for the lines of force between the armature and the pole surface of the core is greater than the resistance between the web of the spacer and the armature. An electromagnetic transducer assembled in this way is characterized by simple design and high efficiency. Of special importance is the fact that it can be made relatively light and yet develops a considerable closing force.

In the further development of the invention it is intended that the sensor will perform clear-cut zero-axis crossings to generate a periodic signal. This design of the sensor makes it possible to trigger the rectangular pulses for controlling the solenoid coils with the zero-axis crossings of the signal generated by the sensor and possibly integrated and/or amplified. In particular the device may have a Schmitt trigger responding to the zero-axis crossings; its output signal is used to drive a monostable multivibrator, whose output pulse duration determines the opening time of the valve tool. In this way particularly well defined conditions are achieved, because the opening time is exactly determined and may be altered as required. Finally the device according to the invention may advantageously include a logarithmic amplifier and means of using the distortion of the input signal due to the logarithmic amplification for varying the duration of the rectangular pulses and/or raising the sensitivity of the indicating instrument to small out-of-balances. In particular the use of logarithmic amplification makes it possible to provide measuring ranges with decadic subdivision, and to raise the sensitivity of the amplifier substantially when the magnitude of the out-of-balance approaches zero.

BRIEF DESCRIPTION OF THE FIGURES OF THE DRAWINGS

Further details and embodiments of the invention are given in the claims in conjunction with the description that follows, in which the invention is described more closely and explained with reference to the practical examples illustrated in the drawings. These show:

FIG. 1 The schematic circuitry of a balancing device for a grinding machine according to the invention, showing the signal path at various points in the circuitry.

FIG. 1a to 1e show signal forms

FIG. 2 The scale of the indicating instrument shown schematically in FIG. 1

FIG. 3 Section A—A through the compartmented wheel in FIG. 1.

FIG. 4 A variant of the spray valve in FIG. 1.

DETAILED DESCRIPTION OF PREFERRED EMBODIMENTS

Figure 5:
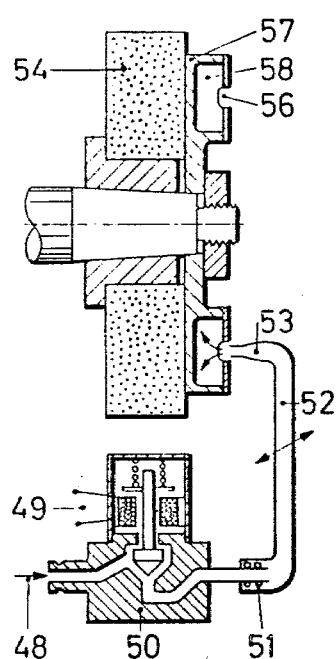
FIG. 5 A solenoid valve arrangement according to the invention with swivelling spray pipe.

The embodiment of the invention shown in FIG. 1 has a vibration sensor 1, which has a base plate 2 which is placed for example on the bearing housing 3 of a rotating body 4. The vibration sensor 1 is shown in the known form of a piezoelectric sensor. Any out-of-balance on the rotating body 4 causes the piezoelectric crystals 5 to generate an essentially sine-wave alternating current voltage as in FIG. 1a. This voltage is first amplified in an amplifier 6 and then rectified in a Graetz circuit 7. The rectified current is indicated by an instrument 8. The output current of the preamplifier does not flow through the Graetz circuit directly but through the resistance 9 to chassis. Thus at the connecting point between resistance 9 and Graetz circuit 7 a voltage results, which is led back to the input of the amplifier 6 via a logarithmic diode circuit 10 as negative feedback. Owing to the logarithmic feedback the indication of instrument 8 is logarithmic and not linear. This means that the instrument 8 must be calibrated logarithmically, like the scale 11 shown in FIG. 2.

By using a logarithmic feedback a very indication range is obtained, so that machines with very slight and servere out-of-balance can be balanced without switching over. Moreover the logarithmic feedback converts the sine-wave signals in FIG. 1a into signals as shown by the wave train in FIG. 1c.

In many cases, however, a linear feedback is more suitable, especially where individual ranges must be covered more exactly by range switchover.

This reshaped signal "c" is led to a Schmitt trigger, which responds to the zero-axis crossings of signal "c" and generates a rectangular signal of the form shown in FIG. 1d. The symmetrical signal that refers to the positive and negative phase is transformed by a monostable multivibrator 34 into an asymmetrical signal. With the positive sections, whose duration amounts to about a third of the cycle, a power amplifier 13 is modulated; its output signal FIG. 1b serves to operate an electromagnetic transducer 14. This transducer has two magnet coils 15 and 20, which are excited periodically by the output signals of the power amplifier 13 and thus set up alternating magnetic fields in the magnetic cup cores 16 and 19, so that the armature 17 with the valve 18 is moved towards the valve seat 21 or the opening stop 22. The spray fluid enters the spray valve 25 under pressure at the connection 24, and is sprayed onto the spray disk 27 through the revolving slot 26. The spray disk 27 is fitted straight onto the rotating body 4 which is to be balanced. In the example illustrated the rotating body 4 is a grinding wheel and the spray medium used is grinding fluid, which is sprayed onto the spray disk 27 in the form of a compartmented wheel. To ensure that the spray medium is shut off during periods when no out-ofbalance is detected by the vibration sensor 1, the spray valve 25 is closed by a compression 23. It is however also possible to equip the electromagnetic transducer 14 with one coil only, which works in opposition to a spring arranged appropriately.

It has been shown, however, that double magnets give more reliable operation at higher speeds. Nevertheless a commercial solenoid valve is employed in many cases.

FIG. 3 show the section A—A in FIG. 1 through the spray disk 27 in the form of a compartmented wheel. The example shown has twelve compartments 28, which are separated by partitions 29. The spray disk 27 is covered by shroud disks 31 and 32, between which the revolving slot 26 for the spray jet 33 is arranged. By appropriate control pulses the electromagnetic transducer or solenoid valve as the case may be is operated so that the spray medium supplied under pressure in the connection 24 is sprayed into a sector, lying opposite the out-of-balance vector at every or every 2nd, 4th etc. revolution, until the out-of-balance vector is compensated. The sector angle $\alpha$ is usually less than 180°.

FIG. 4 shows a variant of the spray valve 35 fitted on the electromagnetic transducer 14 with a slide valve 36. This requires only a moderate opening and closing force even with high pressure of the spray medium, which facilitates the pulsed operation of the valve.

FIG. 5 shows an arrangement according to the invention as a variant of FIG. 1. The spray disk 57 here is a flange fitted to the grinding wheel 54. The spray slot 56 is arranged between the inner and outer shroud disks so that spillage from the individual chambers 58 when the grinding wheel is stationary is prevented to some extent. This enables the fully balanced state to be reached sooner after restarting the grinding wheel in certain applications. Instead of the electromagnetic transducer with the spray valve fitted on it, a commercial solenoid valve 50 is provided; its terminals 49 are connected to the power amplifier 13 in FIG. 1. The spray medium is supplied under pressure to the connection 48 on the solenoid valve 50. The latter is mounted as close to the grinding wheel 54 as possible, e.g. underneath it, and is connected through a swivel coupling 51 with the swivelling connecting pipe 52, which ends with the spray nozzle 53. Consequently the grinding wheel 54 can be taken down after simply swinging the swivelling connecting pipe 52 and the spray nozzle 53 away.

Figure 6:
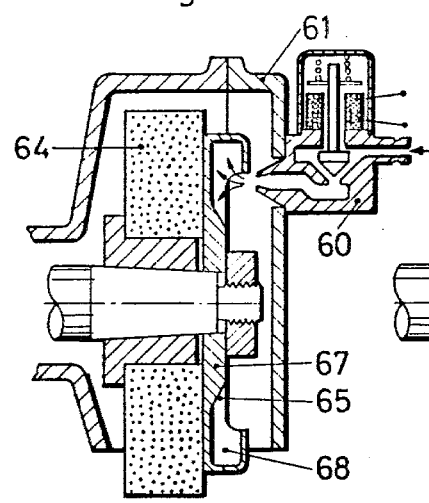
FIG. 6 A configuration according to the invention with the mounting flange in the form of a spray disk.

FIG. 6 shows a variant of FIG. 5. The solenoid valve 60 is fixed straight on the removable hood 61 over the grinding wheel 64. Through appropriate shaping of its central portion 65 the spray disk 67 is designed so that the spray medium accumulating in the individual chambers 68 as a result of balancing, preferably grinding fluid, can drain off completely after the machine is shut down. After every starting operation the balancing system comes into action at once. By placing the solenoid valve immediately in front of the spray disk similar to the arrangement in FIG. 1, extremely accurate and rapid balancing is obtained.

Figure 7:
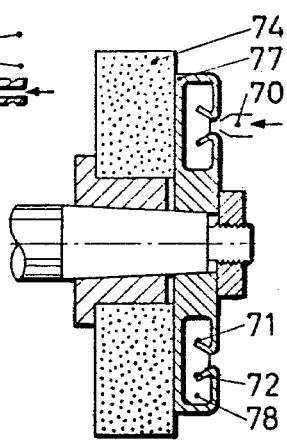
FIG. 7 A configuration according to the invention with the spray disk designed so that the spraying medium cannot run out when the disk is stationary.

FIG. 7 shows a configuration according to the invention with the spray disk 77 again in the form a flange for fitting onto the grinding wheel 74. The chambers 78 have annular inward flanges 71, 72, which are shaped so that the jet from the nozzle 70 can enter but losses of the liquid spray medium are reduced to a minimum when the machine is shut down.

Figure 8:
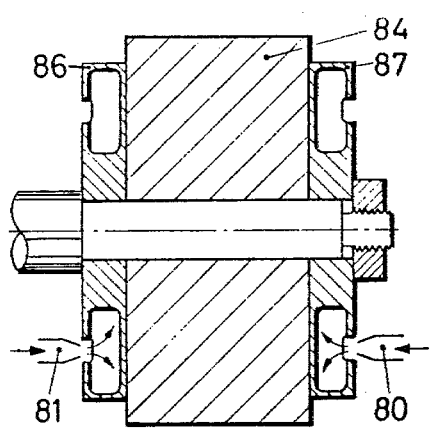
FIG. 8 A balancing body according to the invention, provided with spray disks and nozzles on both sides.

FIG. 8 shows a configuration according to the invention with a wide rotating body 84 fitted on both sides with spray disks 86, 87 which are in turn served by two spray nozzles 80, 81.

Figure 9:
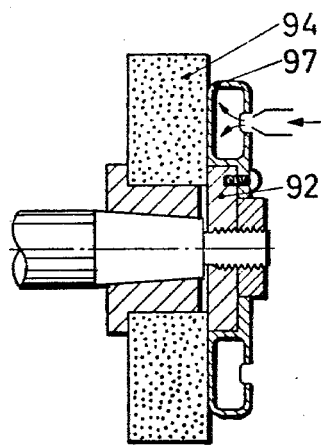
FIG. 9 A configuration according to the invention with the spray disk fitted on the mounted body to be balanced so that it can be removed again.

FIG. 9 shows a configuration according to the invention with the spray disk 97 fixed on the grinding wheel mounting flange 92 by simple joining means. The spray disk 97 may be produced from plastic materials for example, and pressed onto the grinding wheel mounting flange 92 by hand. As already mentioned, such disposable spray disks might be fixed quite generally on rotating bodies which have to be balanced.

Compared with the existing state of the art as mentioned, the present invention makes it possible to extend and simplify balancing operations considerably. The spray valve 25 controlled with one or two impulse magnets, or solenoid valve 50, 60 together with the spray disk fitted on the grinding wheel which is divided into at least three separate chambers, provides a very simple means of monitoring the balance state of the grinding wheel continuously. As soon as the out-of-balance, which is shown continuously on the indicator in FIG. 2, exceeds a certain limit, the balancing operation can be carried out during a working process on the grinding machine by switching-on the electromagnetic transducer 14 manually or automatically, without interfering with the grinding operation in any way. The nozzle of the spray valve 25 is dimensioned so that a normal balancing operation is performed in 30 to 60 seconds. During the run-down after the grinding wheel motor is switched off, the spray medium drains off in a few seconds through appropriate passages in the hub of the compartmented wheel. The spray disk 27 may of course also be mounted on flange 37, so that neither the electromagnetic transducer 14 nor the spray disk 27 has to be dismantled when changing the grinding wheel. The transducer is then fitted permanently in the machine.

FIG. 1 shows a variant whereby the electromagnetic transducer 14 with spray valve is arranged in relation to the rotating spray disk 27 so that the axis of the valve motion is parallel to the axis of rotation of the rotating body 4 and the spray jet lies in the axis of the valve motion. In the example shown, the electromagnetic transducer 14 with the spray valve 25 would have to be swung away in order to change the grinding wheel 4, which is not always practical. It may therefore be of benefit to arrange the injection tangentially, radially or in some intermediate position instead of frontally to the axis of rotation of the spray disk 27. Instead of a compartmented wheel with sectorial chambers, the compartments may assume any other shape; they may for example be simply drilled holes.

Up to speeds of about 5000 revolutions per minute the transducer and valve unit may employ a commercial solenoid valve, especially where water, grinding fluid or grinding oils are used as the spray medium. At higher speeds, electromagnetic transducers 14 must be used with two magnet circuits as in FIG. 1. Spray valves that can be fitted separately are beneficial where plastic solutions are to be sprayed. In such cases the spray valve must be completely dismantled for cleaning after the balancing operation.

The invention is particularly suited for the continuous automatic balancing of grinding wheels on grinding machines. Due to the high effectiveness of the injected compensating mass and the rapid attainment of the fully balanced state, when mounting a new grinding wheel the rough balancing by hand using a static balancing block can be omitted. Especially with intricate workpieces, where a number of grinding wheels are employed successively, a great deal of time is saved by the arrangement according to the invention.

Whether the combination of transducer and valve or the commercial solenoid valve is fitted permanently on the machine or mounted on the safety hood will depend on the particular application. It is also possible to make the spray disk integral with the flange for mounting the grinding wheel. If the spray disk is made of plastic material it can be attached to the grinding wheel mounting flange by simple means.

But the invention is also suitable for the continuous monitoring of any kind of rotating machine on which changes occur in the state of balance due to wear, defects or deposits, necessitating continuous correction in order to avoid bearing damage. It is thus quite possible to equip turbines and blowers with means for continuous monitoring and balancing in accordance with the invention.

Furthermore the invention is suited for individual checks and balancing of a number of rotating machines or machine components as is performed on balancing machines. Corresponding spray disks, of plastic for example, are pressed onto the rotating components prior to balancing. The spray valve according to the invention is fed with a liquid plastic mass, such as a one-component glue which sets quickly. In this way repeated balancing operations can be made fully automatic.

The spray valve according to the invention may also be fed with two separate liquids, one of them being a hardener whereby the liquids are mixed in the nozzle after the valve.

The invention is also suitable for a portable arrangement consisting of oscillation sensor, electronics unit with amplifier and indicating instrument, and solenoid spray valve with spray medium supply. As spray disks inexpensive plastic types may be used, stocked in standard flange diameters. Any rotating machine can be monitored and balanced in simple fashion during operation.

The invention thus enables familiar problems in balancing technique to be overcome in a new, economical and universal manner.

We claim:

1. A device for balancing rotating bodies comprising sensor means responsive to the out of balance of the rotating body for generating a control signal of approximately rectangular pulse shape, an electromagnetic transducer means responsive to the control pulse signal for being operated at a frequency in accordance with the speed of the rotating body, a spray valve combined with the electromagnetic transducer means to form a single spray unit, and at least one spray disk being mounted on the rotating body to be balanced, the spray disk having at least three chambers, means for supplying a spray medium to the single spray unit, the single spray unit having a first nozzle operable to selectively spray the spray medium into any one of the at least three chambers of the spray disk, the single spray unit injecting the spray medium into at least one chamber of the at least three chambers in response to the control pulse signal with correct phasing during the normal revolutions of the rotating body until the amount of spray medium injected compensates for the out of balance of the rotating body.

2. A device according to claim 1, wherein the electromagnetic transducer means includes two solenoid coils for controlling the closing and opening of the spray valve, the spray valve being provided with a compression spray with an adjustable preload for enabling valve closure.

3. A device according to claim 1, wherein the electromagnetic transducer means includes a single solenoid coil for being energized to open the spray valve in opposition to a spring arranged for closing the spray valve.

4. A device according to claim 1, wherein the spray valve includes one of a cone-shaped and flat valve seat.

5. A device according to claim 1, wherein the spray valve is a slide valve.

6. A device according to claim 1, 2, 3, 4 or 5, wherein the rotating body is a grinding wheel and the spray disk is mountable on a grinding wheel flange.

7. A device according to claim 6, wherein the spray disk is integral with the grinding wheel flange.

8. A device according to claim 6, further comprising a swivelling connecting pipe for supplying the spray medium from the single spray unit to the spray disk.

9. A device according to claim 6, wherein the single spray unit is mountable on a safety hood surrounding the grinding wheel.

10. A device according to claim 1, wherein the at least one spray disk comprises first and second spray disks mounted on opposite sides of the rotating body with the single spray unit having the first nozzle operable to selectively spray the spray medium into any one of the chambers of the first spray disk and a second nozzle operable to selectively spray the spray medium into any one of the chambers of the second spray disk.

11. A device according to claim 1, wherein the spray disk is in the form of a compartmented wheel having the at least three chambers, the chambers being of any geometrical shape.

12. A device according to claim 11, wherein the at least three chambers are delimited by partitions arranged only at the outer circumference of the spray disk, the partition being interrupted in the region of the central portion of the spray disk.

13. A device according to claim 11, further comprising means for enabling the spray medium to drain off from the spray disk when the rotation of the rotating body is slowed down or stopped.

14. A device according to claim 11, further comprising means for preventing the spray medium from draining off from the spray disk when the rotation of the rotating body is slowed down or stopped.

15. A device according to claim 1, wherein the spray medium is a sprayable liquid.

16. A device according to claim 1, wherein the spray medium is a self-adhering quick-drying plastic medium.

17. A device according to claim 1, wherein the spray medium includes two separate liquids, one of the liquids being a hardener.

18. A device according to claim 1, wherein the single spray unit provides a pulsed jet to spray medium directly into a selected chamber opposite an outlet of the spray unit during a portion of each revolution of the rotating body until the amount of spray medium injected compensates for the out-of-balance of the rotating body.

* * * * *